US009933776B2

(12) United States Patent
Ota et al.

(10) Patent No.: US 9,933,776 B2
(45) Date of Patent: Apr. 3, 2018

(54) NUMERICAL CONTROL DEVICE TO CHANGE PARAMETER USING NC PROGRAM

(71) Applicant: FANUC Corporation, Minamitsuru-gun, Yamanashi (JP)

(72) Inventors: Yasuhiro Ota, Minamitsuru-gun (JP); Hideaki Maeda, Minamitsuru-gun (JP); Akira Egashira, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 230 days.

(21) Appl. No.: 14/933,159

(22) Filed: Nov. 5, 2015

(65) Prior Publication Data
US 2016/0132044 A1 May 12, 2016

(30) Foreign Application Priority Data
Nov. 7, 2014 (JP) ................................ 2014-227137

(51) Int. Cl.
G05B 19/4155 (2006.01)
G05B 19/408 (2006.01)

(52) U.S. Cl.
CPC ............... *G05B 19/4083* (2013.01); *G05B 2219/33109* (2013.01); *G05B 2219/33122* (2013.01)

(58) Field of Classification Search
CPC ............ G05B 19/4083; G05B 19/4155; G05B 2219/31103; G05B 2219/33109; G05B 2219/33122
USPC ........................................................ 700/86
See application file for complete search history.

(56) References Cited

U.S. PATENT DOCUMENTS

| 4,805,112 A | 2/1989 | Neko | |
|---|---|---|---|
| 5,748,465 A * | 5/1998 | Kaneko | G05B 19/4141 340/3.2 |
| 8,089,810 B2 * | 1/2012 | Kawase | G09G 3/3655 365/185.11 |
| 8,666,522 B2 * | 3/2014 | Nakamura | G05B 19/4068 318/568.1 |
| 9,684,299 B2 * | 6/2017 | Chung | G05B 19/408 |

(Continued)

FOREIGN PATENT DOCUMENTS

| JP | H08-168841 A | 7/1996 |
|---|---|---|
| JP | H11-77485 A | 3/1999 |

(Continued)

OTHER PUBLICATIONS

Decision to Grant a Patent dated Sep. 20, 2016 in Japanese Patent Application No. 2014-227137 (3 pages) with an English Translation (3 pages).

*Primary Examiner* — Chun Cao
(74) *Attorney, Agent, or Firm* — Drinker Biddle & Reath LLP (57) ABSTRACT

A numerical control device includes an NC program storing unit, a parameter change unit configured to change parameter based on parameter change operation by an operator, a parameter change monitoring unit configured to detect change of the parameter by monitoring the parameter change unit and output command for starting the NC program based on the change of the parameter, and an NC program execution unit configured to execute the NC program based on command from the parameter change monitoring unit.

6 Claims, 13 Drawing Sheets

(56) References Cited

U.S. PATENT DOCUMENTS

| | | | | |
|---|---|---|---|---|
| 2010/0114359 A1* | 5/2010 | Kommareddy | .... | G05B 19/4093 700/173 |
| 2012/0283851 A1* | 11/2012 | Yamamoto | ............. | G05B 19/19 700/56 |
| 2013/0006396 A1* | 1/2013 | Kito | ................... | G05B 19/4093 700/83 |
| 2016/0062337 A1* | 3/2016 | Taira | ................ | G05B 19/40937 700/160 |
| 2016/0116908 A1* | 4/2016 | Ikki | ................... | G05B 19/4155 700/86 |

FOREIGN PATENT DOCUMENTS

| | | |
|---|---|---|
| JP | H11-231914 A | 8/1999 |
| JP | 2002-149206 A | 5/2002 |
| JP | 2005-085095 A | 3/2005 |

\* cited by examiner

| PARAMETER | MEANING OF PARAMETER | SET VALUE |
|---|---|---|
| 27901 | NC PROGRAM NUMBER TO BE STARTED WHEN PARAMETER IS CHANGED | 8001 |

```
G10L52;      PARAMETER INPUT MODE SET COMMAND
N__(P__)R__; PARAMETER INPUT COMMAND
G11;         PARAMETER INPUT MODE CANCEL COMMAND
     NOTE
     N__: PARAMETER NUMBER
     P__: AXIS NUMBER (ONLY FOR AXIS TYPE PARAMETER)
     R__: PARAMETER SET VALUE
```

| PARAMETER | MEANING OF PARAMETER | SET VALUE |
|---|---|---|
| 27900 | CHANGED PARAMETER NUMBER | 14730 |
| 27901 | NC PROGRAM NUMBER TO BE STARTED WHEN PARAMETER WITH SET NUMBER OF PARAMETER NUMBER 27900 IS CHANGED | 8001 |

FIG. 7

| SET VALUE | MEANING OF SET VALUE |
|---|---|
| 1 | MACHINE CONFIGURATION 1 (FOUR AXES OF X, Z, C, Y) |
| 2 | MACHINE CONFIGURATION 2 (FIVE AXES OF X, Z, C, Y, B) |
| 3 | MACHINE CONFIGURATION 3 (SIX AXES OF X, Z, C, Y, B, A) |
| 4 | MACHINE CONFIGURATION 4 (THREE AXES OF X, Z, C) |
| : | : |
| n | MACHINE CONFIGURATION N (TWO AXES OF X, Z) |

| PARAMETER | MEANING OF PARAMETER | SET VALUE |
|---|---|---|
| 27900 | CHANGED PARAMETER NUMBER 1 | 14730 |
| 27901 | NC PROGRAM NUMBER TO BE STARTED WHEN PARAMETER WITH SET NUMBER OF PARAMETER NUMBER 27900 IS CHANGED | 8001 |
| 27902 | CHANGED PARAMETER NUMBER 2 | 14731 |
| 27903 | NC PROGRAM NUMBER TO BE STARTED WHEN PARAMETER WITH SET NUMBER OF PARAMETER NUMBER 27902 IS CHANGED | 8002 |
| 27904 | CHANGED PARAMETER NUMBER 3 | 14732 |
| 27905 | NC PROGRAM NUMBER TO BE STARTED WHEN PARAMETER WITH SET NUMBER OF PARAMETER NUMBER 27904 IS CHANGED | 8003 |
| : | : | : |

FIG. 10

| PARAMETER | MEANING OF PARAMETER |
|---|---|
| 14730 | TYPE OF MACHINE CONFIGURATION |
| 14731 | TYPE OF EXTERNAL DEVICE (LOADER) |
| 14732 | TYPE OF EXTERNAL DEVICE (PARTS CATCHER) |

```
O8001                      ···DETERMINATION FOR MACHINE CONFIGURATION 1
IF[P14730EQ1]THEN
  G10L52;
  N1020P3R67;              ···THIRD AXIS NAME = "C"
  N1020P4R89;              ···FOURTH AXIS NAME = "Y"
  N1020P6R0;               ···SIXTH AXIS NAME IS NONE
  N1022P3R6;               ···THIRD AXIS IS PARALLEL TO Y AXIS
  N1022P4R2;               ···FOURTH AXIS IS Y AXIS
  N1022P6R0;               ···SIXTH AXIS DOES NOT EXIST
    :
  G11;
  IF[P14801EQ1]THEN        ···DETERMINATION FOR MACHINE CONFIGURATION 1 WHEN
PARAMETER OF NUMBER 14801 IS 1 (WITH BACK DRILL)                              } PARAMETER
    G10L52;                                                                     REWRITING
    N1020P5R66;            ···FIFTH AXIS NAME = "B"                             COMMAND
    N1022P5R7;             ···FIFTH AXIS IS PARALLEL TO Z AXIS                  WITH BACK
                                                                                DRILL
    G11;
  ELSE                     ···DETERMINATION FOR MACHINE CONFIGURATION 1 WHEN
PARAMETER OF NUMBER 14801 IS NOT 1 (WITHOUT BACK DRILL)
    G10L52;                                                                   } PARAMETER
    N1020P5R0;             ···FIFTH AXIS NAME IS NONE                           REWRITING
    N1022P5R0;             ···FIFTH AXIS DOES NOT EXIST                         COMMAND
                                                                                WITHOUT
    G11;                                                                        BACK DRILL
  ENDIF
ENDIF
   :
IF[P14730EQn]THEN          ···DETERMINATION FOR MACHINE CONFIGURATION N
  G10L52;
  N1020P4R0;               ···FOURTH AXIS NAME IS NONE
  N1020P5R0;               ···FIFTH AXIS NAME IS NONE
  N1020P6R0;               ···SIXTH AXIS NAME IS NONE
  N1022P4R0;               ···FOURTH AXIS DOES NOT EXIST
  N1022P5R0;               ···FIFTH AXIS DOES NOT EXIST
  N1022P6R0;               ···SIXTH AXIS DOES NOT EXIST
    :
  G11;
  IF[P14801EQ1]THEN        ···DETERMINATION FOR MACHINE CONFIGURATION N WHEN
PARAMETER OF NUMBER 14801 IS 1 (WITH BACK DRILL)                              } PARAMETER
    G10L52;                                                                     REWRITING
    N1020P3R66;            ···THIRD AXIS NAME = "B"                             COMMAND WITH
    N1022P3R7;             ···THIRD AXIS IS PARALLEL TO Z AXIS                  BACK DRILL
    G11;
  ELSE                     ···DETERMINATION FOR MACHINE CONFIGURATION N WHEN
PARAMETER OF NUMBER 14801 IS NOT 1 (WITHOUT BACK DRILL)                       } PARAMETER
    G10L52;                                                                     REWRITING
    N1020P3R0;             ···THIRD AXIS NAME IS NONE                           COMMAND
    N1022P3R0;             ···THIRD AXIS DOES NOT EXIST                         WITHOUT BACK
                                                                                DRILL
    G11;
  ENDIF
ENDIF
M99
```

FIG. 13

```
O8001
If[P14730EQ1]THEN        ···DETERMINATION FOR MACHINE CONFIGURATION 1
  G10L52;
  N1020P3R67;            ···THIRD AXIS NAME = "C"
  N1020P4R89;            ···FOURTH AXIS NAME = "Y"
  N1020P6R0;             ···SIXTH AXIS NAME IS NONE
  N1022P3R6;             ···THIRD AXIS IS PARALLEL TO Y AXIS
  N1022P4R2;             ···FOURTH AXIS IS Y AXIS
  N1022P6R0;             ···SIXTH AXIS DOES NOT EXIST
    :
  G11;
  If[#1032EQ1]THEN       ···DETERMINATION FOR MACHINE CONFIGURATION 1 ⎫
  WHEN INTERFACE #1032 IS 1 (CONNECTED TO BAR FEEDER)                 ⎪ PARAMETER
    G10L52;                                                           ⎬ REWRITING
      N1020P5R66;        ···FIFTH AXIS NAME = "B"                     ⎪ COMMAND WITH
      N1022P5R7;         ···FIFTH AXIS IS PARALLEL TO Z AXIS          ⎪ BAR FEEDER
        :                                                             ⎭ CONNECTION
    G11;
  ELSE                   ···DETERMINATION FOR MACHINE CONFIGURATION 1 ⎫
  WHEN INTERFACE #1032 IS 0 (NOT CONNECTED TO BAR FEEDER)             ⎪ PARAMETER
    G10L52;                                                           ⎬ REWRITING
      N1020P5R0;         ···FIFTH AXIS NAME IS NONE                   ⎪ COMMAND
      N1022P5R0;         ···FIFTH AXIS DOES NOT EXIST                 ⎪ WITHOUT BAR
        :                                                             ⎪ FEEDER
    G11;                                                              ⎭ CONNECTION
  ENDIF
ENDIF
  :
If[P14730EQn]THEN        ···DETERMINATION FOR MACHINE CONFIGURATION N
  G10L52;
  N1020P4R0;             ···FOURTH AXIS NAME IS NONE
  N1020P5R0;             ···FIFTH AXIS NAME IS NONE
  N1020P6R0;             ···SIXTH AXIS NAME IS NONE
  N1022P4R0;             ···FOURTH AXIS DOES NOT EXIST
  N1022P5R0;             ···FIFTH AXIS DOES NOT EXIST
  N1022P6R0;             ···SIXTH AXIS DOES NOT EXIST
    :
  G11;
  If[#1032EQ1]THEN···DETERMINATION FOR MACHINE CONFIGURATION N WHEN   ⎫ PARAMETER
  INTERFACE #1032 IS 1 (CONNECTED TO BAR FEEDER)                      ⎪ REWRITING
    G10L52;                                                           ⎬ COMMAND
      N1020P3R66;        ···THIRD AXIS NAME = "B"                     ⎪ WITH BAR
      N1022P3R7;         ···THIRD AXIS IS PARALLEL TO Z AXIS          ⎪ FEEDER
        :                                                             ⎭ CONNECTION
    G11;
  ELSE···DETERMINATION FOR MACHINE CONFIGURATION N WHEN INTERFACE #1032 ⎫ PARAMETER
  IS 0 (NOT CONNECTED TO BAR FEEDER)                                  ⎪ REWRITING
    G10L52;                                                           ⎬ COMMAND
      N1020P3R0;         ···THIRD AXIS NAME IS NONE                   ⎪ WITHOUT BAR
      N1022P3R0;         ···THIRD AXIS DOES NOT EXIST                 ⎪ FEEDER
        :                                                             ⎭ CONNECTION
    G11;
  ENDIF
ENDIF
M99
```

NUMERICAL CONTROL DEVICE TO CHANGE PARAMETER USING NC PROGRAM

RELATED APPLICATION DATA

This application claims priority under 35 U.S.C. § 119 and/or § 365 to Japanese Application No. 2014-227137 filed Nov. 7, 2014, the entire contents is incorporated herein by reference.

BACKGROUND OF THE INVENTION

1. Field of the Invention

The present invention relates to a numerical control device, and more particularly, to a numerical control device capable of changing plural parameter based on machine configuration specified by condition such as a set of parameter using NC program.

2. Description of the Related Art

Figure 14:
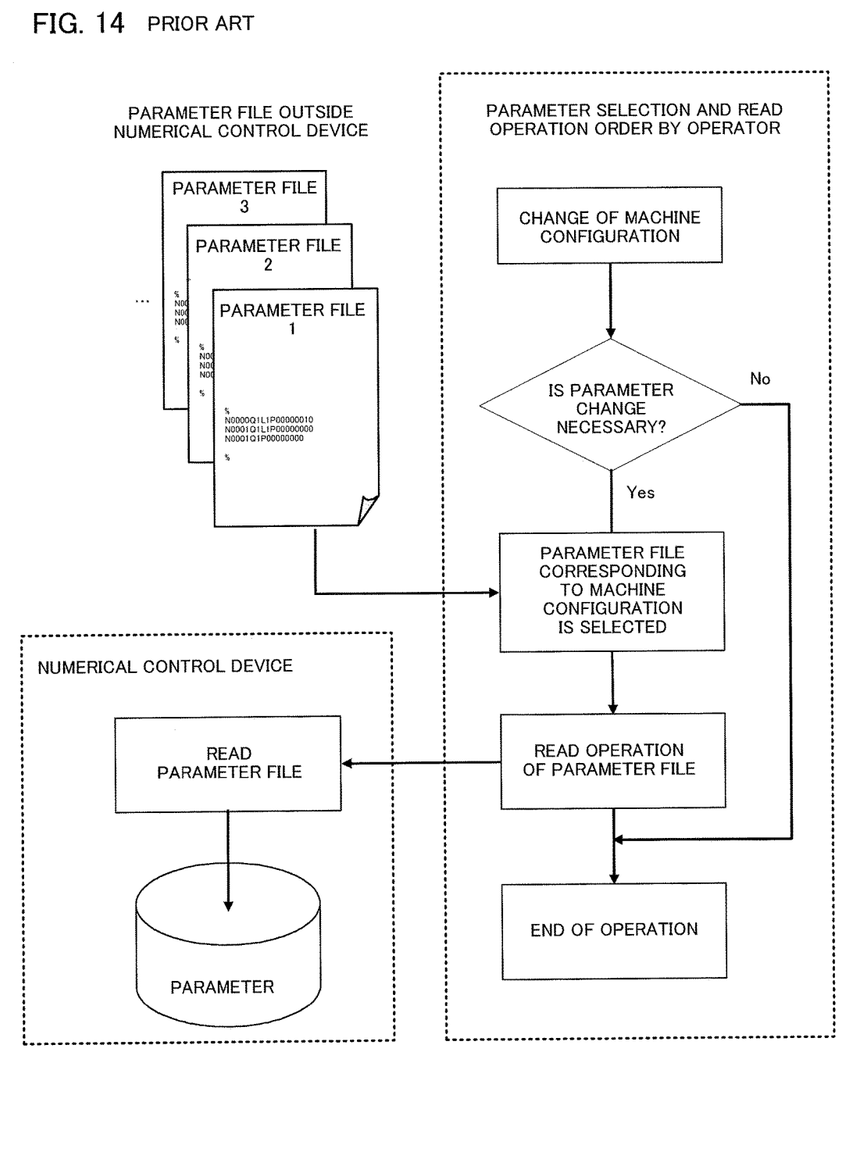
FIG. 14 is a diagram illustrating parameter setting method in the prior art 1.

FIG. 14 is a schematic diagram illustrating parameter setting method in a prior art. In the prior art, plural parameter files, which are set corresponding to a specified machine configuration, is prepared outside a numerical control device in advance. Parameter change is performed in such a way that, in order to change parameter to correspond to a specified machine configuration, an operator selects the parameter file corresponding to the machine configuration to be read, and set the parameter file in the numerical control device.

Figure 15:
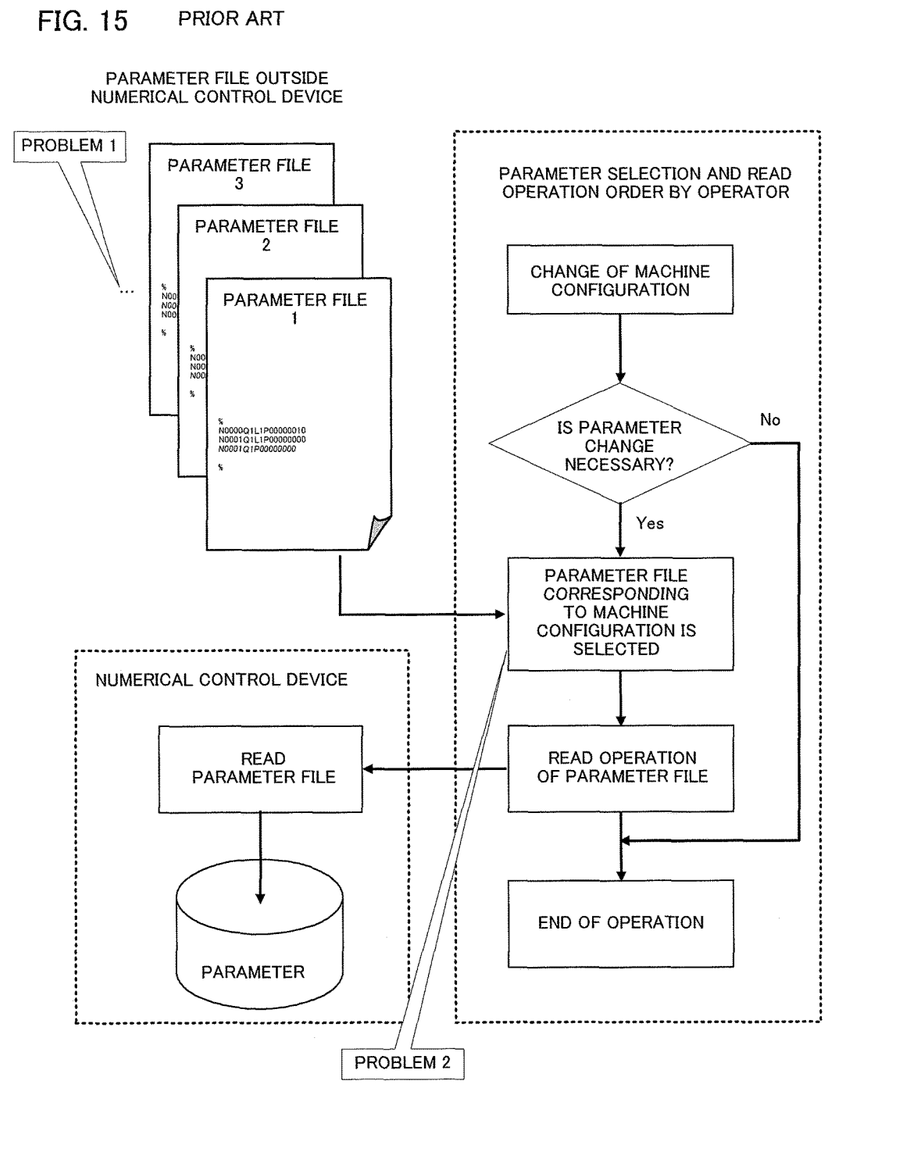
FIG. 15 is a diagram illustrating problem of parameter setting method in the prior art 1.
Figure 16:
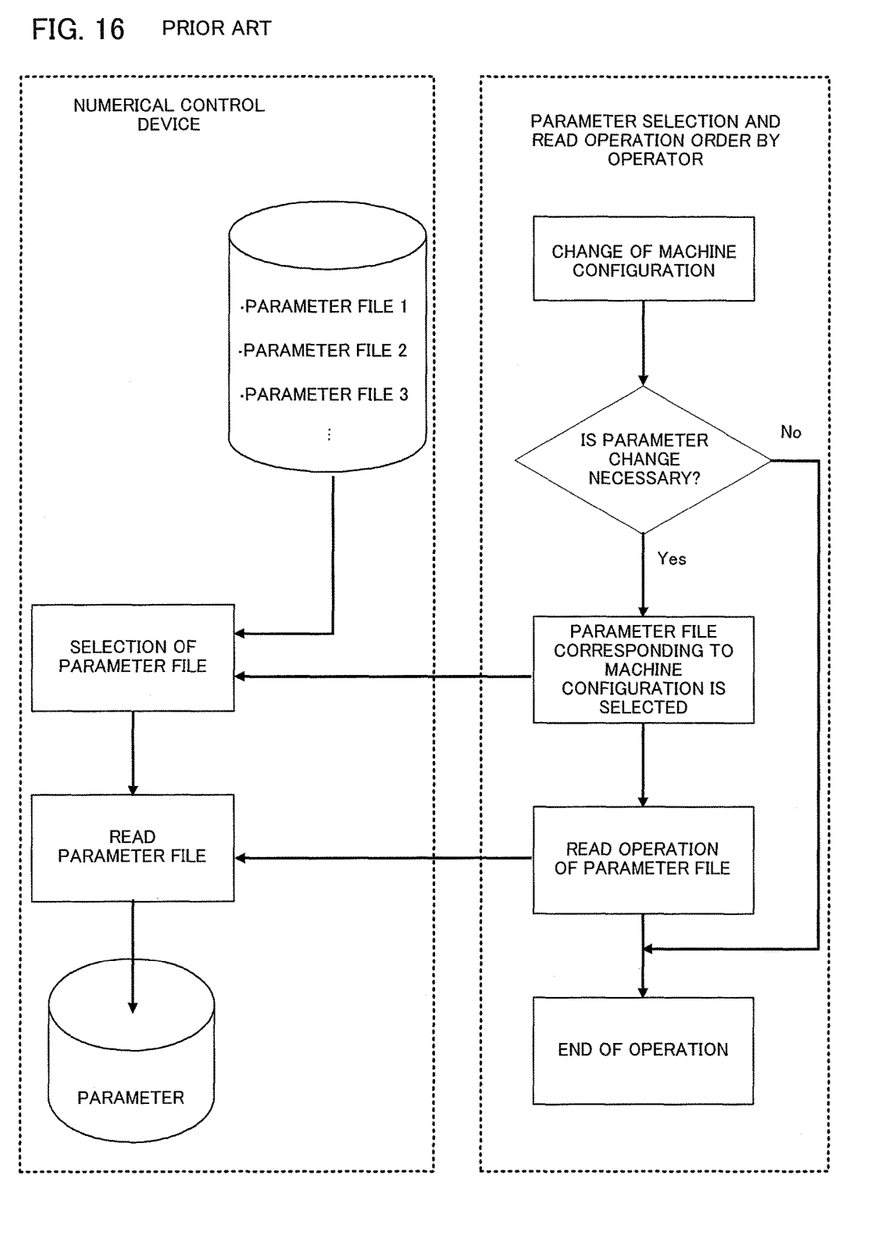
FIG. 16 is a diagram illustrating parameter setting method in the prior art 2.

However, there has been a problem as shown in FIG. 15 in the conventional parameter change method. That is, as shown in the problem 1 in FIG. 15, when many machine configuration patterns exist, many patterns of parameter files need to be prepared in advance. In addition to that, as shown in the problem 2 in FIG. 15, it is necessary for the operator to confirm the many parameter files one by one and select the parameter file corresponding to the current machine configuration to be read, in order to select the parameter file corresponding to the current machine configuration from the many parameter files. Thus heavy burden has been imposed on the operator.

As an prior art for changing the parameter of the numerical control device, a parameter change method, in which a user selects from a parameter file from plural parameter files set in memory and the state is changed corresponding to the selected parameter file, is proposed in Japanese Patent Laid-Open No. 2002-149206.

Figure 17:
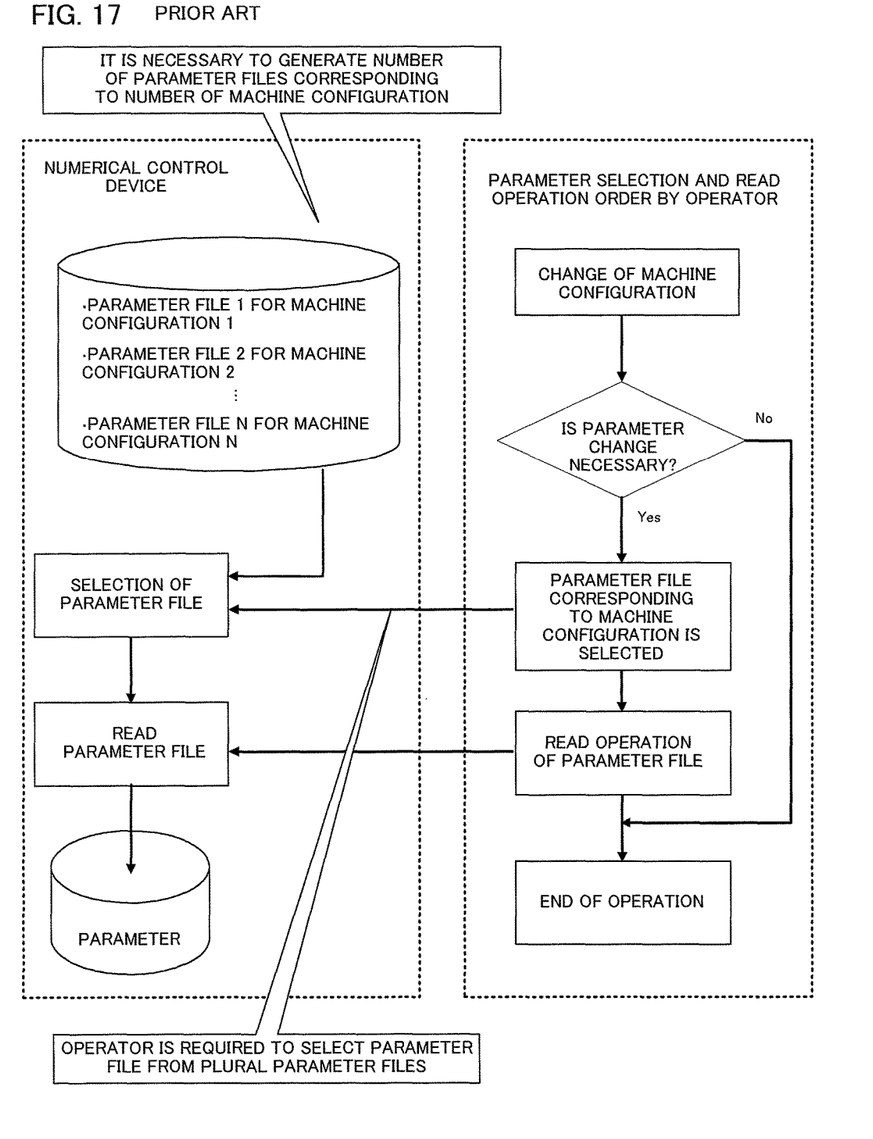
FIG. 17 is a diagram illustrating problem of parameter setting method in the prior art 2.

However, though in the method in Japanese Patent Laid-Open No. 2002-149206, the burden of the operator is decreased to some extent by preparing parameter files in the memory of the numerical control device, it is similar to the prior art shown in FIG. 14 in a point that it is necessary to prepare plural parameter files, and the above mentioned problem that the operator himself/herself is required to select a file from the plural files as shown in FIG. 17 is not solved.

SUMMARY OF THE INVENTION

Therefore, the object of the present invention is to provide a numerical control device capable of changing plural parameter based on machine configuration specified by condition such as a set of parameter using NC program.

The numerical control device according to the present invention is the numerical control device configured to change parameter using NC program including an NC program storing unit configured to store the NC program including parameter rewriting command for changing parameter set in the numerical control device, a parameter change unit configured to change parameter based on parameter change operation by an operator, a parameter change monitoring unit configured to detect change of the parameter by monitoring the parameter change unit and output command for starting the NC program based on the change of the parameter and, an NC program execution unit configured to execute the NC program based on command from the parameter change monitoring unit.

The numerical control device may further include an execution program setting unit configured to store changed parameter number and NC program number of the NC program to be started, wherein the parameter change monitoring unit is configured to detect the change of the parameter and output stating command of the NC program based on the parameter number and the NC program number stored in the execution program setting unit.

The NC program may include condition determination sentence for change the parameter of the numerical control device, and the NC program execution unit is configured to control rewriting of the parameter based on determination result by the condition determination sentence.

The condition determination sentence may use at least one of parameter value of the parameter set in the numerical control device and signal value of the numerical control device.

The present invention, with the above configuration, can start the NC program when the parameter is changed, and selectively and appropriately change the other plural parameters based on the optional configuration, other parameter or signal state, in the NC program. In addition to that, since the NC program to be started for parameter change is an ordinary NC program, the operator can freely program the parameter change, corresponding to various kinds of machining devices.

BRIEF DESCRIPTION OF THE DRAWINGS

The above-described object, the other object, and the feature of the invention will be proved from the description of embodiments below with reference to the accompanying drawings. In these drawings:

FIG. 12 is a diagram illustrating an example of NC program for parameter change which controls parameter setting based on plural parameters according to the present invention.

DETAILED DESCRIPTION OF THE PREFERRED EMBODIMENTS

Embodiments of the present invention will be described with reference to the drawings. Components identical or similar to components in the prior art are indicated by identical reference numerals.

Figure 1:
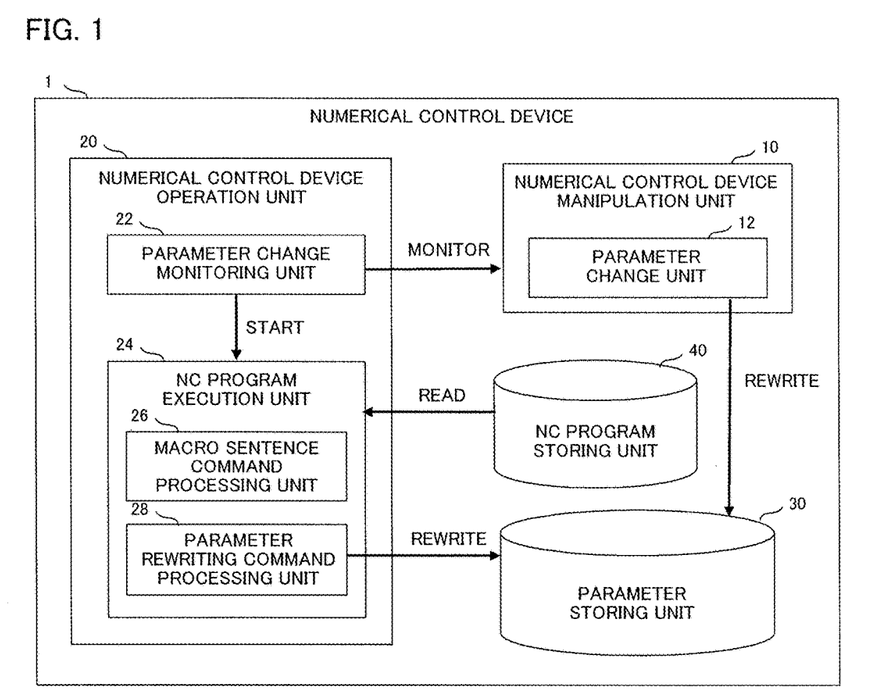
FIG. 1 is a functional block diagram of a numerical control device according to an embodiment of the present invention.

FIG. 1 is a functional block diagram of a numerical control device according to an embodiment of the present invention. The numerical control device 1 in the present embodiment includes a numerical control device manipulation unit 10, a numerical control device operation unit 20, a parameter storing unit 30, and an NC program storing unit 40.

The numerical control device manipulation unit 10 has function of receiving parameter change manipulation by the operator, and rewriting parameter of the numerical control device 1 stored in the parameter storing unit 30. The parameter change manipulation is performed in such a way that the operator manipulates an MDI unit or a console panel equipped in the numerical control device 1. The numerical control device manipulation unit 10 acquires parameter to be changed and value of the parameter after the change based on the manipulation and sends a command to a parameter change unit 12 to rewrite the parameter value of the parameter. The parameter change unit 12 specifies the parameter to be changed from parameters stored in the parameter storing unit 30, and rewrites the specified parameter to the parameter valued after the change acquired based on the manipulation by the operator.

The numerical control device operation unit 20 is a functional unit to perform operation of the numerical control device 1, and includes a parameter change monitoring unit 22, and an NC program execution unit 24.

The parameter change monitoring unit 22 always monitors the parameter change by the parameter change unit 12, and sent a command to the NC program execution unit to execute the NC program for parameter change when the parameter change is detected.

The NC program execution unit 24 receives the command form the parameter change monitoring unit 22, reads and executes the NC program for parameter change stored in the NC program storing unit 40. The NC program execution unit 24 includes a macro sentence command processing unit 26 which analyzes macro sentence described in the NC program for parameter change and generates parameter rewriting command, and a parameter rewriting command processing unit 28 which rewrites the parameter stored in the parameter storing unit 30 based on the parameter rewriting command generated by the macro sentence command processing unit 26.

An embodiment for changing parameter of the numerical control device 1 by the NC program for parameter change in the numerical control device 1 of the present invention with the above configuration will be described below.

<First Embodiment>

Figure 2:
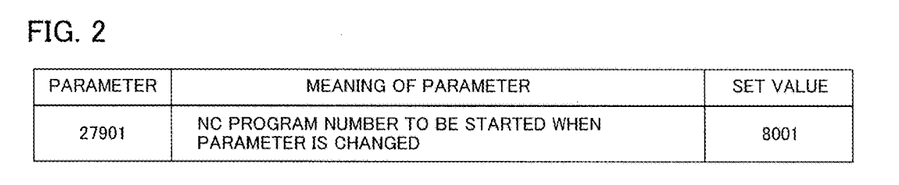
FIG. 2 is a diagram illustrating a configuration example of NC program for parameter change to be started according to the first embodiment of the present invention.

In the first embodiment of the present invention, a parameter shown in FIG. 2 is introduced to enable setting of "NC program number to be started for parameter change". For example, in the configuration example shown in FIG. 2, NC program O8001 is started when the parameter is changed, and the parameter is changed to an appropriate parameter corresponding to the machine configuration.

In this way, the NC program for parameter change to be executed by the NC program execution unit 24 when any parameter of the numerical control device 1 is changed by the numerical control device manipulation unit 10 is configured to be designated, and a command for setting plural appropriate other parameters corresponding to the changed parameter is described in the NC program for parameter change, such that an appropriate parameter corresponding to the machine configuration is automatically set only by performing minimum required parameter setting by the operator.

The parameter manually set by the operator in the numerical control device manipulation unit 10 may be, for example, a number allocated to the machine configuration, or a minimum required parameter of the machine configuration to be set by the operator. The NC program for parameter change may be freely described by a machinery maker or an end user.

Figure 3:
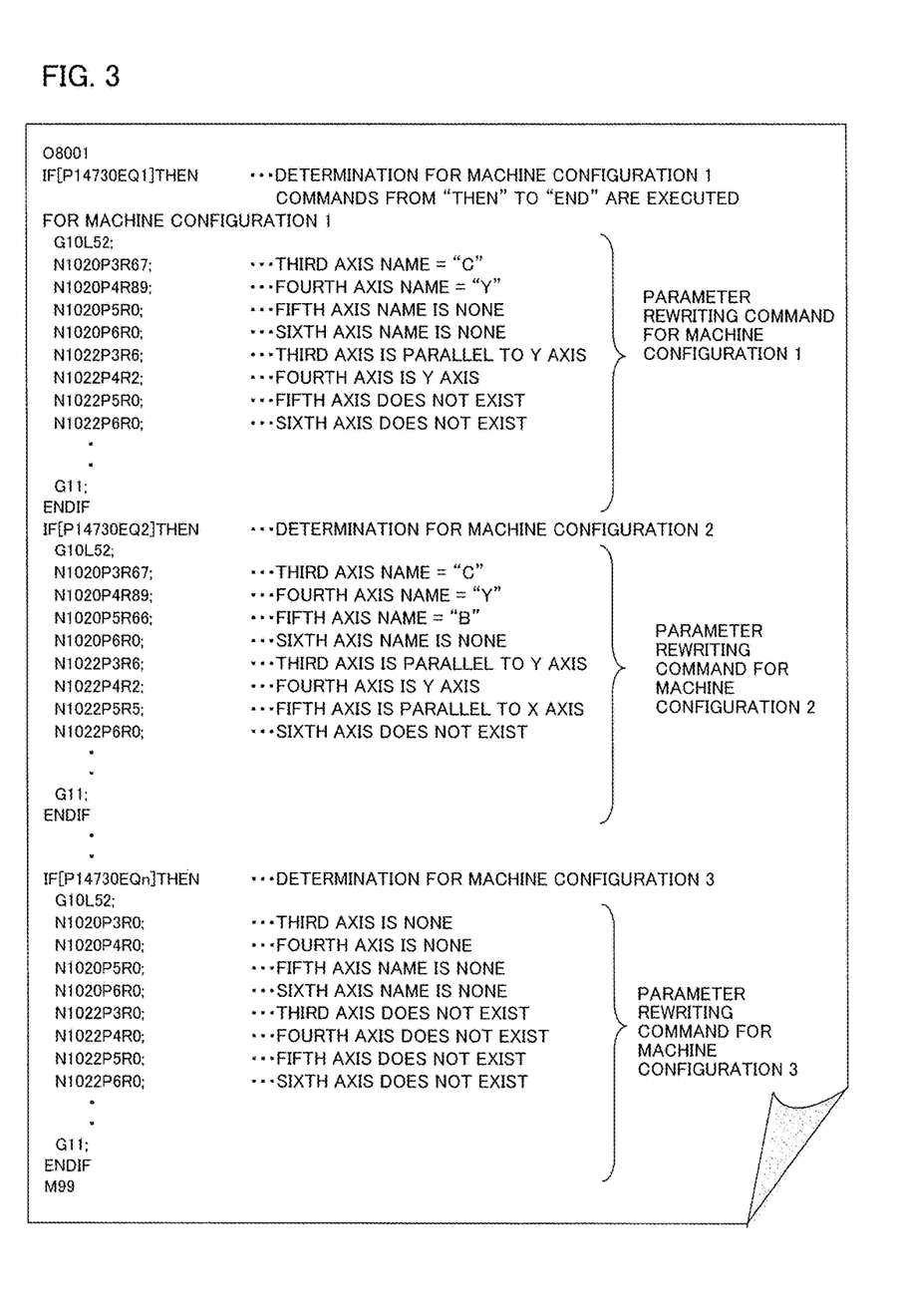
FIG. 3 is a diagram illustrating an example of NC program for parameter change to be started according to the first embodiment of the present invention.

FIG. 3 shows an example of the NC program to be started at parameter change. As shown in the figure, the NC program in the present invention is described by a conditional sentence which uses the parameter value of the numerical control device 1 as the condition. In the NC program shown in the figure, when value of a parameter of P14730, which designates a number of machine configuration, is 1, the machine configuration to be controlled by the numerical control device 1 is determined to be machine configuration 1, and parameter for each axis is set by a command starting from the third line in the figure.

Figure 4:
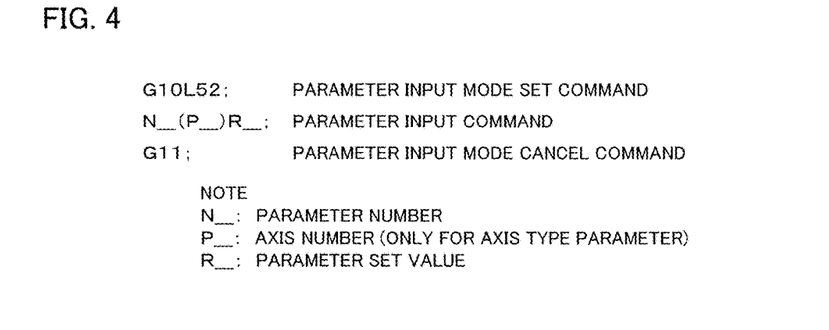
FIG. 4 is a diagram illustrating an example of parameter rewriting command to be used for NC program for parameter change according to the present invention.

In the program shown in FIG. 3, each command described in blocks G10L52 to G11 is a parameter rewriting command in the present embodiment, and respectively has the meaning shown in FIG. 4.

A parameter input command is described between a parameter input mode setting command and a parameter input mode cancel command such that parameter values of plural parameter number can be simultaneously set.

Figure 5:
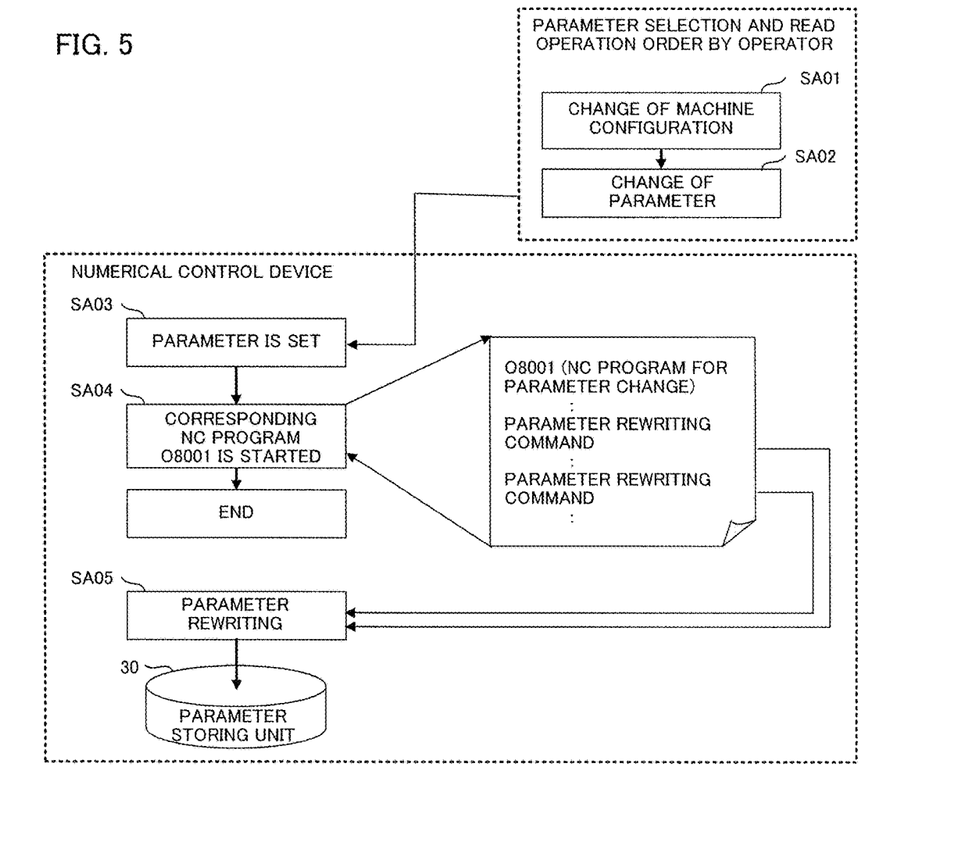
FIG. 5 is a flowchart of parameter rewriting according to the first embodiment of the present invention.

Flow of parameter rewriting by the NC program O8001 shown in FIG. 3 will be described using FIG. 5.

[Step SA01] The operator change machine configuration of the machine to be controlled by the numerical control device 1.

[Step SA02] The operator manipulates an MDI unit or a console panel, to change parameter value of the parameter set in the numerical control device 1 corresponding to the machine configuration. When the change is performed, it is not necessary for the operator to change all parameters, but the operator changes minimum required parameter.

[Step SA03] The parameter change unit 12 sets the parameter value of the parameter changed by the manipulation of the operator.

[Step SA04] The parameter change monitoring unit 22 detects the parameter change by the parameter change unit 12, and starts the NC program for parameter change O8001.

[Step SA05] Parameter values of parameters of the numerical control device 1 stored in the parameter storing unit 30 is set based on the command of the NC program O8001 for parameter change.

In this way, in the numerical control device 1 in the present embodiment, only if the operator changes the minimum required parameter when the machine configuration is changed, the other parameter is automatically set by the NC program for parameter change. Since the machinery maker or the operator can freely generates the NC program for parameter change, it become possible to set appropriate parameter corresponding to the specifications of the machine to be controlled or the motion characteristics of the machine to be actually controlled.

<Second Embodiment>

In the numerical control device 1 of the first embodiment, the parameter shown in FIG. 2 is introduced to enable setting of "NC program number to be started for parameter change", the parameter change is monitored by the parameter change monitoring unit 22, the NC program for parameter change is started when any parameter is changed, enabling the required parameter setting to be executed automatically. In the present embodiment, a parameter shown in FIG. 6 is introduced to enable setting of "correspondence of changed parameter number and NC program number to be started".

Figure 6:
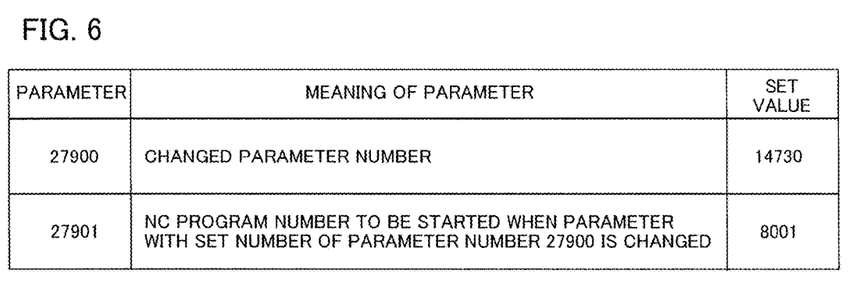
FIG. 6 is a diagram illustrating a configuration example of NC program for parameter change to be started according to the second embodiment of the present invention.
Figure 7:
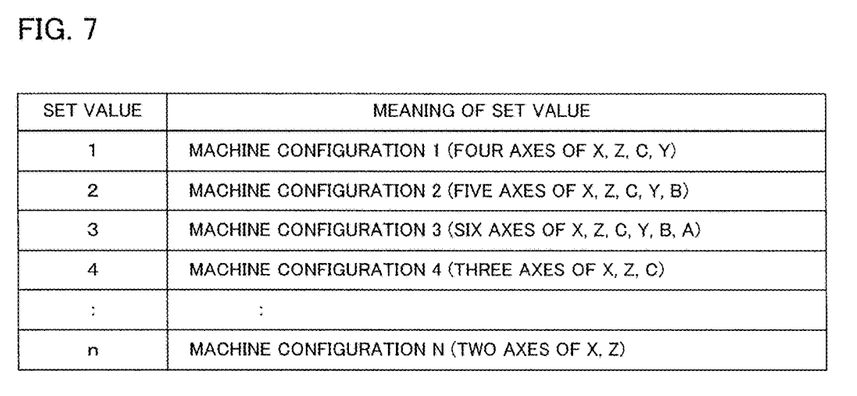
FIG. 7 is a diagram illustrating an example of parameters of a numerical control device according to the second embodiment of the present invention.

For example, in the configuration example shown in FIG. 6, the NC program O8001 for parameter setting is set to start when a parameter of parameter number 14730, which is a parameter for setting machine configurations 1 to n. When the parameter value of the parameter number 14730 designates the machine configuration type as shown in FIG. 7, by describing parameter rewriting commands corresponding to each machine configuration in the NC program O8001 for parameter change. When the value of the parameter number 14730 is changed, corresponding NC program O8001 is started and appropriate parameter is set corresponding to the changed machine configuration.

Figure 8:
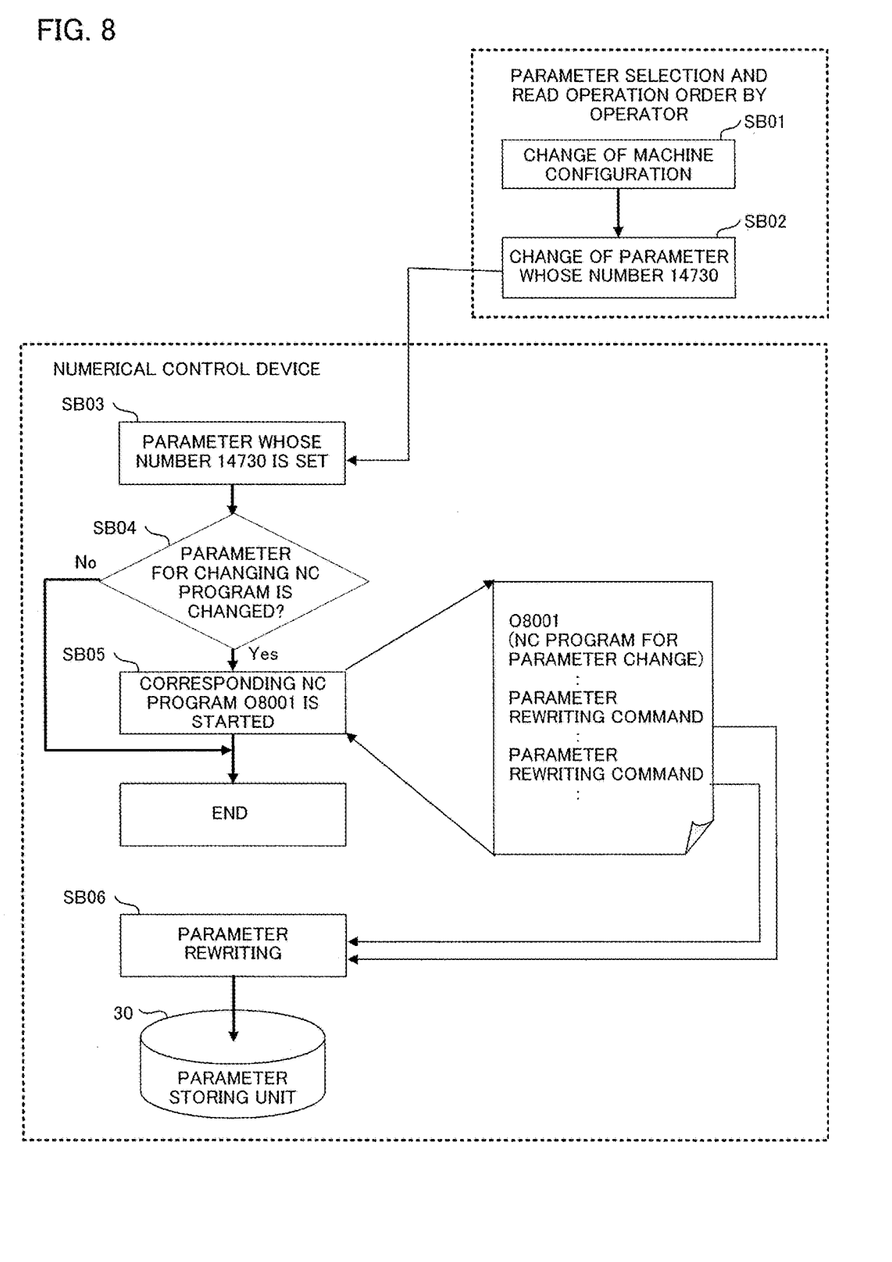
FIG. 8 is a flowchart of parameter rewriting according to the second embodiment of the present invention.

Flow of parameter rewriting in the numerical control device 1 of the present embodiment will be described referring to FIG. 8.

[Step SB01] The operator change machine configuration of the machine to be controlled by the numerical control device 1.

[Step SB02] The operator manipulates an MDI unit or a console panel, to change parameter value of the parameter (with parameter number 14730) set in the numerical control device 1 corresponding to the machine configuration.

[Step SB03] The parameter change unit 12 sets the parameter value of the parameter (with parameter number 14730) changed by the manipulation of the operator.

[Step SB04] The parameter change monitoring unit 22 determines whether the parameter change by the parameter change unit 12 is parameter change for starting the NC program for parameter change. The process proceeds to Step SB05 when the parameter change by the parameter change unit 12 is the parameter change for starting the NC program for parameter change, and the process ends when not.

[Step SB05] The NC program O8001 for machinery configuration setting is started.

[Step SB06] Based on command of the NC program O8001 for machinery configuration setting, parameter values of parameters of the numerical control device 1 stored in the parameter storing unit 30 are set.

In this way, in the numerical control device 1 in the second embodiment, if the operator changes the specified parameter when the machine configuration is changed, the other parameter is automatically set by the NC program for parameter change.

<Third Embodiment>

Figure 9:
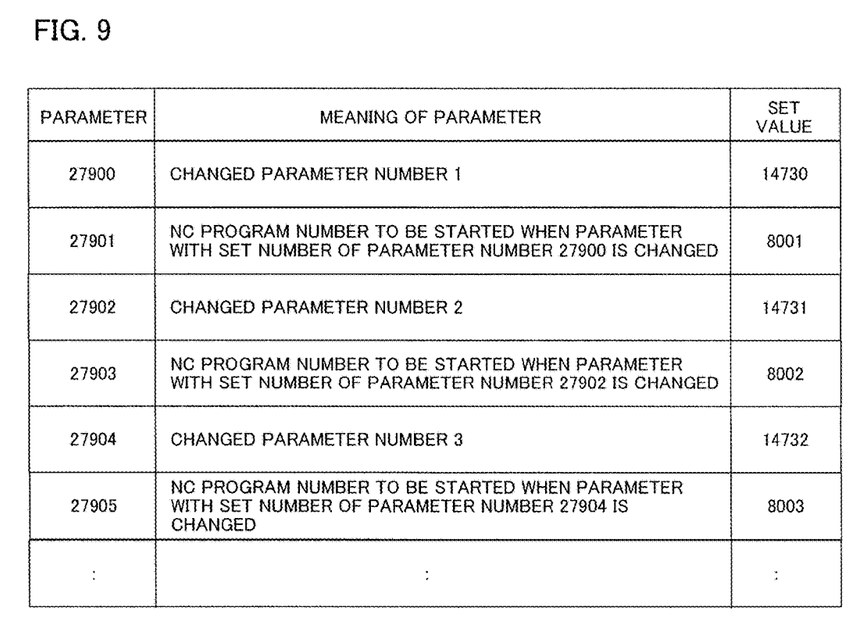
FIG. 9 is a diagram illustrating a configuration example of NC program for parameter change to be started according to the third embodiment of the present invention.

In the numerical control device 1 of the second embodiment, a parameter shown in FIG. 6 is introduced to enable setting of "correspondence of changed parameter number and NC program number to be started", change of the specified parameter which is set is monitored by the parameter change monitoring unit 22, enabling starting of the NC program for parameter change when the specified parameter is changed. In the present embodiment, a parameter shown in FIG. 9 is introduced, to enable setting of plural sets of "correspondence of changed parameter number and NC program number to be started".

Figure 10:
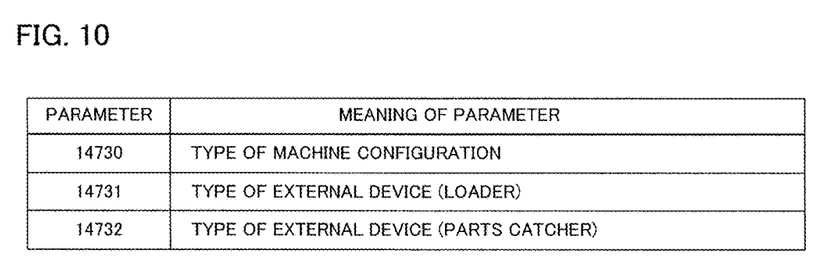
FIG. 10 is a diagram illustrating an example of parameters of a numerical control device according to the third embodiment of the present invention.

For example, when the meanings of the parameters of parameter numbers 14730 to 14732 are defined as shown in the table in FIG. 10, in a configuration example shown in FIG. 9, the plural sets of correspondence are set as below. The NC program O8001 for parameter change of the machine configuration is started when a parameter of parameter number 14730, which is a parameter for setting machine configuration type, is changed. The NC program O8002 for parameter change of an external device (a loader) is started when a parameter of parameter number 14731, which is a parameter for setting type of the external device (the loader), is changed. The NC program O8003 for parameter change of an external device (a parts catcher) is started when a parameter of parameter number 14732, which is a parameter for setting type of the external device (the parts catcher), is changed.

Figure 11:
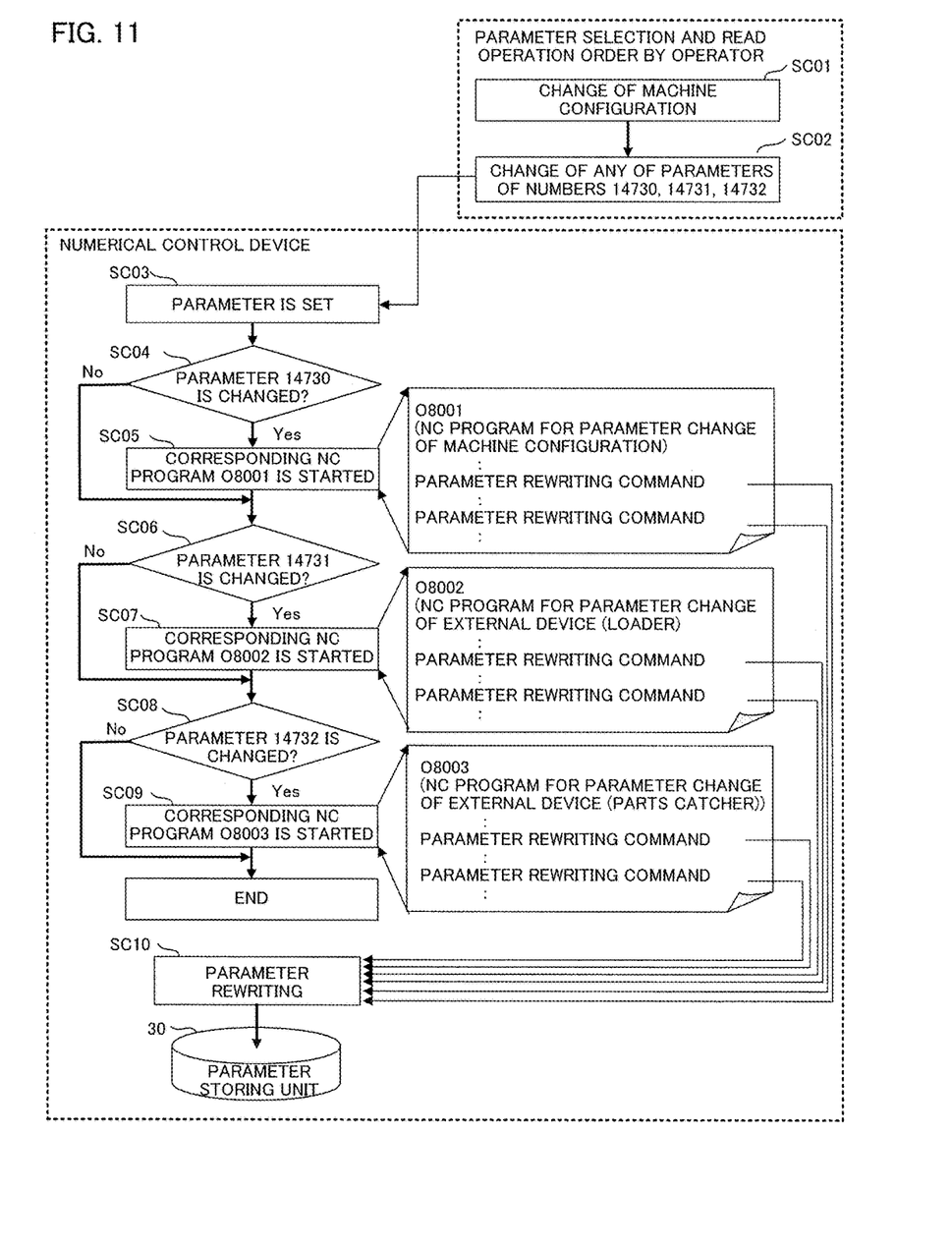
FIG. 11 is a flowchart of parameter rewriting according to the third embodiment of the present invention.

For a case with the above setting, flow of parameter rewriting in the numerical control device 1 of the present embodiment will be described referring to FIG. 11.

[Step SC01] The operator change machine configuration of the machine to be controlled by the numerical control device 1.

[Step SC02] The operator manipulates an MDI unit or a console panel, to change parameter value of the parameters (with parameter numbers 14730, 14731, and 14732) set in the numerical control device 1 corresponding to the machine configuration.

[Step SC03] The parameter change unit 12 sets the parameter value of the parameters (with parameter numbers 14730, 14731, and 14732) changed by the manipulation of the operator.

[Step SC04] The parameter change monitoring unit 22 determines whether the parameter change by the parameter change unit 12 is parameter change of the parameter number 14730 for starting the NC program for parameter change. The process proceeds to Step SC05 when the parameter change by the parameter change unit 12 is the parameter change of the parameter number 14730 for starting the NC program for parameter change, and the process proceeds to Step SC06 when not.

[Step SC05] The NC program O8001 for parameter change is started.

[Step SC06] The parameter change monitoring unit 22 determines whether the parameter change by the parameter change unit 12 is parameter change of the parameter number 14731 for starting the NC program for parameter change. The process proceeds to Step SC07 when the parameter change by the parameter change unit 12 is the parameter change of the parameter number 14731 for starting the NC program for parameter change, and the process proceeds to Step SC08 when not.

[Step SC07] The NC program O8002 for parameter change is started.

[Step SC08] The parameter change monitoring unit 22 determines whether the parameter change by the parameter change unit 12 is parameter change of the parameter number 14732 for starting the NC program for parameter change. The process proceeds to Step SC09 when the parameter change by the parameter change unit 12 is the parameter change of the parameter number 14732 for starting the NC program for parameter change, and the process ends.

[Step SC09] The NC program O8003 for parameter change is started.

[Step SC10] Based on command of the NC programs O8001 to O8003 for parameter change, parameter values of parameters of the numerical control device 1 stored in the parameter storing unit 30 are set.

In this way, in the numerical control device 1 in the present embodiment, it is possible to rewrite parameter by starting appropriate NC program for parameter change corresponding to the parameter change, even when the parameter to be set is different depending on the type of the machine configuration, the external devices, or the like.

<Other Embodiments>

In the numerical control device 1 in the embodiments described above, examples of the NC programs for parameter change are shown in which parameter value of one parameter is used as a bifurcation condition to set the other parameter. However, the NC program for parameter change in the present invention is not limited to these examples, but an NC program for parameter change which changes parameters to be appropriate parameters using a set of plural parameters as a condition, may be generated and used.

For example, as shown in FIG. 12, by using nesting form of determination by parameter value of parameter number 14730 (machine configuration type) using IF-THEN sentence and determination by parameter value of parameter number 14801 (whether back drill exists or not) using IF-THEN sentence, an NC program for parameter change can be generated which appropriately set parameter value of a parameter which requires different set value for a case with back drill and for a case without back drill, when the value for machine configuration is 1.

In the numerical control device 1 in the embodiments described above, examples of the NC programs for parameter change are shown in which parameter value of a parameter is used as a bifurcation condition to set the other parameter. However, the NC program for parameter change in the present invention is not limited to these examples, but an NC program for parameter change which changes parameters to be appropriate parameters using signals acquired through the interface or the like as a bifurcation condition, may be generated and used.

Figure 13:
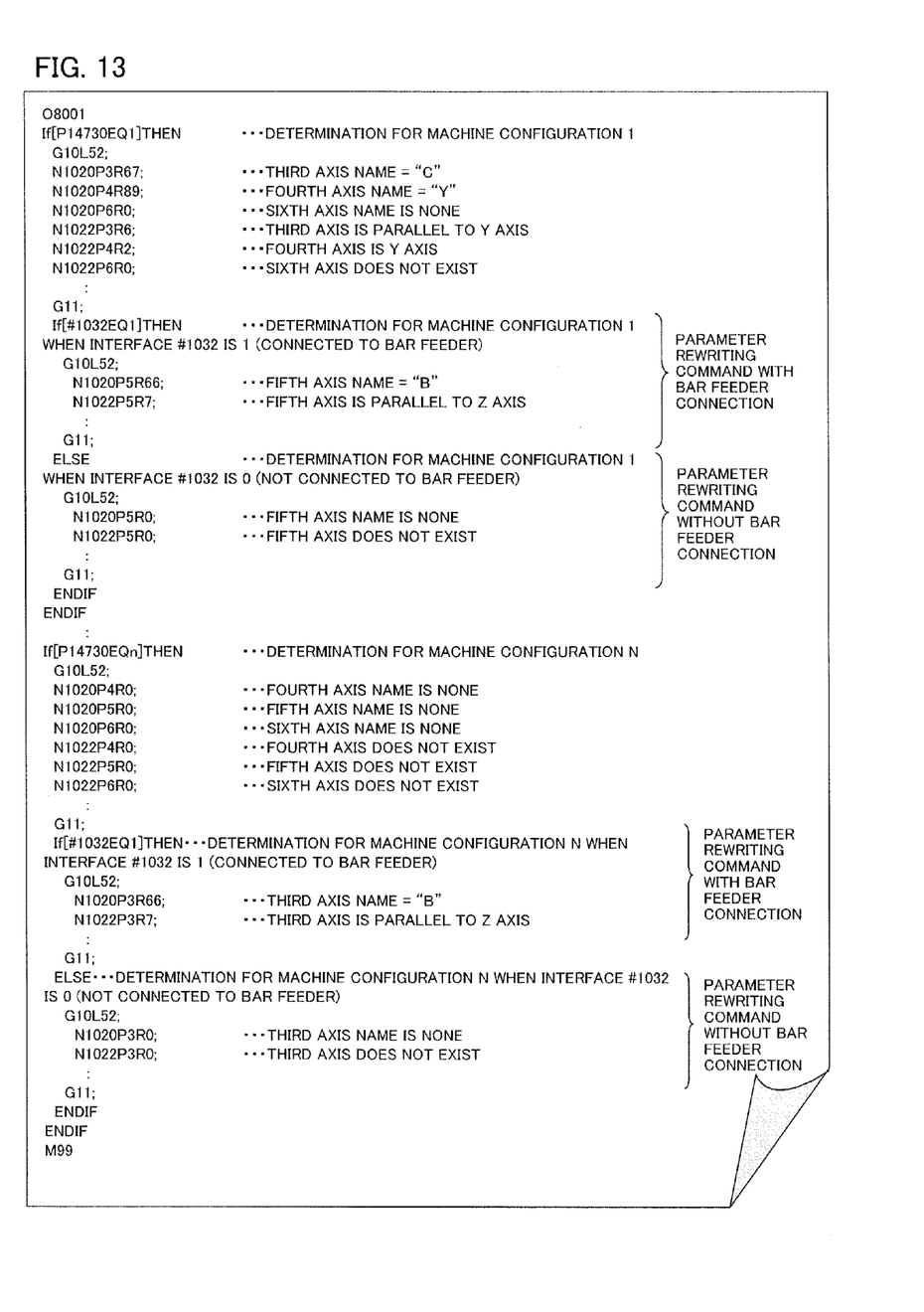
FIG. 13 is a diagram illustrating an example of NC program for parameter change which controls parameter setting based on parameter and machine signal according to the present invention.

For example, as shown in FIG. 13, by using nesting form of determination by parameter value of parameter number 14730 (machine configuration type) using IF-THEN sentence and determination by signal value of interface signal #1032 (whether bar feeder connection exists or not) using IF-THEN sentence, an NC program for parameter change can be generated which appropriately set parameter value of a parameter which requires different set value for a case with bar feeder connection and for a case without bar feeder connection, when the value for machine configuration is 1.

The embodiments of the present invention are described above. The present invention is not limited to the above-described embodiments, and, of course, the configuration thereof can be appropriately modified to be implemented in other embodiments.

The invention claimed is:

1. A numerical control device configured to change parameter using NC program, comprising:
    an NC program storing unit configured to store the NC program including a parameter rewriting command for changing a parameter set in the numerical control device;
    a parameter storage unit configured to store a plurality of parameters of the numerical control device;
    a numerical control device manipulation unit configured to acquire, from an operator, a parameter to be changed and a value of the parameter to be changed, and configured to send a command to rewrite the parameter value of the received parameter to be changed;
    a parameter change unit configured to specify the parameter to be changed from the plurality of parameters stored in the parameter storage unit based on the acquired parameter received from the operator, and configured to rewrite the specified parameter to the acquired parameter value;
    a parameter change monitoring unit configured to detect a change of the parameter by monitoring the parameter change unit, and configured to output a command for starting the NC program based on the detected change of the parameter; and
    an NC program execution unit configured to execute the NC program based on the command from the parameter change monitoring unit.

2. A numerical control device according to claim 1, further comprising:
    an execution program setting unit configured to store a changed parameter number and a NC program number of the NC program to be started,
    wherein the parameter change monitoring unit is configured to detect the change of the parameter, and configured to output the command for starting the NC program based on the parameter number and the NC program number stored in the execution program setting unit.

3. A numerical control device according to claim 1, wherein the NC program includes a condition determination sentence for changing the parameter of the numerical control device, and
    wherein the NC program execution unit is configured to control rewriting of the parameter based on a determination result based on the condition determination sentence.

4. A numerical control device according to claim 3, wherein the condition determination sentence uses at least one of a parameter value of the parameter set in the numerical control device and a signal value of the numerical control device.

5. A numerical control device according to claim 2,
wherein the NC program includes a condition determination sentence for changing the parameter of the numerical control device, and
wherein the NC program execution unit is configured to control rewriting of the parameter based on a determination result based on the condition determination sentence.

6. A numerical control device according to claim 5, wherein the condition determination sentence uses at least one of a parameter value of the parameter set in the numerical control device and a signal value of the numerical control device.

* * * * *